United States Patent Office 2,979,463
Patented Apr. 11, 1961

2,979,463

REFRIGERANT COMPOSITION

Carl S. Ferguson, Stratham, N.H.

No Drawing. Filed Mar. 21, 1956, Ser. No. 572,787

4 Claims. (Cl. 252—70)

This application is a continuation-in-part of my co-pending application Serial No. 255,144, filed November 6, 1951, and later abandoned. The invention relates to compositions of matter to be mixed with ice or water to make a refrigerant. More particularly, the invention relates to dry powder mixtures to be mixed with water or ice for immediate refrigeration.

The invention relates also to compositions which include a substantial aqueous constituent and are intended to be subjected to freezing prior to their use as a refrigerant. The latter compositions may be in the form of a liquid, paste or gel at ordinary atmospheric temperatures and may be enclosed in any desired kind of containers such as cans of any shape, plastic bags, boxes or the like. Such packages can be refrozen for repeated use, especially if the container is moisture-proof. The proportions of the ingredients in the mixtures can be varied to provide various melting-points and hence various temperature levels of refrigeration.

According to the invention the powdery mixtures hereinafter described contain (1) ingredients of high endothermic capacity which are primarily melting-point depressants when mixed with ice and temperature depressants when mixed with ice or water, (2) ingredients which are primarily heat insulators to retard heat inflow, and (3) ingredients having the property of mixing with relatively large quantities of water to form non-liquid pastes or gels. In some cases where the presence of free liquid is not objectionable, the third class of ingredients may be omitted. The relative amounts of such ingredients are varied, within limits, according to the particular service for which the refrigerant mixture is designed. The greater the proportion of depressants to the other ingredients, the lower the temperatures which can be obtained, but the relationship is not linear. In addition to the three principal classes of ingredients mentioned, certain secondary ingredients may be employed for special purposes as hereinafter described.

As temperature depressants I employ urea or a compound of urea such as urea oxalate, together with ammonium chloride, potassium chloride, or both. In some cases I may employ sodium chloride or ammonium nitrate, or both.

Urea is an organic compound of high solubility in water and high endothermic capacity. It also has the advantages of being non-toxic, non-corrosive and non-ionizing. The presence of the non-ionizing organic compound appears to reduce materially the corroding potential of the mixture.

Ammonium chloride is an inorganic compound of high solubility, but having a slower rate of solution than that of urea, and of high endothermic capacity. A mixture of urea and ammonium chloride in proper proportions can produce a lower freezing temperature than either by itself. Urea and ammonium chloride complement each other in their refrigerating effect when mixed with water by reason of their different rates and degrees of solubility. Urea has the greater solubility and rate of solution in water and thus produces a quick temperature-depressing effect. The more slowly dissolving chloride adds to and prolongs the refrigerating effect.

Potassium chloride, in addition to its function as a temperature depressant and melting point depressant, makes for a more uniform refrigerating effect, and increases the B.t.u. capacity of the water-powder or ice-powder mixture. For some purposes, the composition may also include some sodium chloride or ammonium nitrate or both.

To prolong the refrigerating effect produced by mixing a powder mixture with water or ice, the ingress of heat is retarded by the inclusion of one or more heat-insulating ingredients in the composition and, if desired, one or more ingredients for increasing the viscosity of the aqueous constituent of the mixture. As examples of water-insoluble heat insulating substances, I may employ plaster of Paris or powdered asbestos or a mixture of the two.

In most cases it is desirable to avoid the presence of any free liquid in the water-powder mixture or resultant free liquid in the ice-powder mixture. For this purpose ingredients are included which have a high water-absorbing capacity with the resultant formation of a non-flowing paste or gel. Of the several substances capable of use for this purpose, I prefer locust bean gum, carboxy methyl cellulose, vermiculite, bentonite, or mixtures of these or other ingredients such as Karaya, tragacanth or guar gum, for the formation of a non-fluid paste. If a gel is desired, locust bean gum may be used with balanced proportions of monosodium phosphate and borax. By using the proper proportions of gel-forming ingredients, any desired consistency may be obtained from a thin gel which is almost fluid to a very stiff gel. For convenience, the paste-forming or gel-forming substances are hereinafter referred to as viscosity-increasing agents.

In addition to the principal ingredients hereinbefore mentioned for depressing temperatures and melting points, retarding heat inflow and holding the aqueous constituent in a non-fluid state such as a paste or gel, auxiliary ingredients may be included to improve the composition as a whole. For example, it is desirable to keep the composition slightly acidic in order to prevent the escape of ammonia from the ammonium salt or salts, especially if the mixture contains asbestos. For this purpose I may use mono-calcium phosphate, aluminum sulphate or potassium alum. If locust bean gum is in the mixture, potassium alum has the added function of increasing the effectiveness of the gum as a paste-forming viscosity agent.

The proportions of the ingredients in the powdery mixture will vary to some extent according to whether it is to be mixed with water or ice, and according to the depressant effect to be obtained. For satisfactory results, in a dry powder mixture, for each part by weight of heat-insulating material there should be from eight to seventeen parts of temperature depressants, whether or not the mixture includes a viscosity agent. In any mixture the combined weight of the insulation and depressants should be not less than 70% of the whole, disregarding the auxiliary ingredients. In percentages by weight the principal ingredients should be within the following ranges:

| | Percent |
|---|---|
| Temperature depressants | 66–88 |
| Heat insulation | 4–12 |
| Viscosity agents | 0–30 |

If any viscosity agent is employed, the actual amount employed will depend primarily on the quantity of water or ice with which the powdery composition is to be mixed.

For the formation of a gel with water or ice, the viscosity agent is preferably locust bean gum mixed with borax and monosodium phosphate, the proportions of these ingredients depending on the consistency desired.

As hereinbefore stated the preferred temperature depressants used in the powdery mixtures are urea, ammonium chloride, and potassium chloride. If the powder is to be mixed with water for immediate refrigeration effect, for every part by weight of ammonium chloride there should be from two to four parts urea. The quantity of potassium chloride in the mixture of depressants for use with either water or ice should be between 10% and 24%, of such mixture.

If the temperature depressants are to be used with ice, for every part by weight of ammonium chloride there should be from one to two parts urea. For use with ice, sodium chloride may be added to or substituted for part or all of the potassium chloride.

Following are some specific examples of dry mixtures illustrating the invention as designed for various purposes.

*Example 1.*—Composition for use with water for immediate refrigeration effect, with gel formation:

| | Percent |
|---|---|
| Urea | 50 |
| Ammonium chloride | 15 |
| Potassium chloride | 12 |
| Plaster of Paris | 8 |
| Locust bean gum | 12 |
| Borax | 1½ |
| Monosodium phosphate | 1½ |

Mixing this powder with half its weight of water reduces the initial temperature about 50 degrees.

*Example 2.*—For use with water or ice, with gel formation:

| | Percent |
|---|---|
| Urea | 46 |
| Ammonium chloride | 23 |
| Potassium chloride | 9 |
| Plaster of Paris | 4 |
| Locust bean gum | 15 |
| Borax | 1½ |
| Monosodium phosphate | 1½ |

Mixed with 1 or 2 parts water, this reduces the initial temperature 30 to 50 degrees. Mixed with 2 to 3 parts ice, lower temperatures and a more sustained refrigerating effect are obtained.

*Example 3.*—For use with ice in compartments with drains, as in motor trucks or refrigerator railroad cars:

| | Percent |
|---|---|
| Urea | 36 |
| Ammonium chloride | 28 |
| Potassium chloride | 12 |
| Sodium chloride | 12 |
| Monocalcium phosphate | 4 |
| Plaster of Paris | 4 |
| Asbestos | 4 |

Mix with 2 to 5 parts ice.

*Example 4.*—For shipping-packages, with gel formation:

| | Percent |
|---|---|
| Urea | 24 |
| Ammonium chloride | 18 |
| Potassium chloride | 12 |
| Sodium chloride | 12 |
| Plaster of Paris | 4 |
| Locust bean gum | 27 |
| Borax | 1½ |
| Monosodium phosphate | 1½ |

Mix with 2 to 3 parts ice. When ice melts, there will be no free liquid.

As hereinbefore stated, the invention also relates to premixed aqueous compositions for repeated freezing, such compositions including melting-point depressants, heat insulating ingredients and viscosity agents. These ingredients are preferably the same as those hereinbefore described for powdery mixtures, but not necessarily in the same proportions. In such premixed aqueous compositions, the dry weight of the melting-point depressants is at least eight times the dry weight of the heat insulating ingredients. Since such mixtures are intended for repeated reuse, a preservative is desirable when the mixture contains a vegetable gum or the like. For this purpose I prefer a solution of butyl para-hydroxy benzoic acid in propylene glycol. In some instances sodium benzoate is satisfactory.

According to the invention, these aqueous mixtures are preferably made up in paste or gel form with melting points ranging from 20° F. to −20° F., the particular melting-point in any case being determined by the ratio of the combined melting-point depressants to the aqueous constituent and the ratios of the individual melting-point depressants in the mixture to one another.

To obtain melting-points approximately within the range stated, the amount by weight of the combined depressants should be from ⅕ to ½ of the weight of the aqueous constituent. The ratio of urea to ammonium chloride should be between four to one and two to one. The quantity of potassium chloride present should be from one-third to four times the combined weights of the urea and ammonium chloride.

The potassium chloride, in addition to being a melting-point depressant, makes for a more uniform refrigerating effect, imparts added hardness and greater uniformity of texture to the frozen compositions and increases the B.t.u. capacity by causing a greater latent heat value. For example, it tends to prevent in the process of freezing the formation of pockets of unfrozen solution of increased concentration, which congeals after the rest of the solution has solidified. The relatively wide variation in the proportions of potassium chloride to the combined urea and ammonium chloride is necessary to secure maximum latent heat value, uniformity of freezing, and uniformity of melting-point at the desired temperature.

Viscosity agents are desirable in aqueous mixtures both for retarding heat inflow and also for preventing leakage by limiting or eliminating fluidity of the mixture. Such agents may be paste-forming or gel-forming as hereinbefore described.

As a viscosity agent, locust bean gum is preferred and should be present in a proportion of between 2 oz. and 24 oz. per gallon of water, depending on the degree of viscosity desired. For paste-formation potassium alum should be used with the locust bean gum, from one to two ounces of the alum being used for each gallon of water regardless of the amount of gum used. For gel-formation, locust bean gum is used in a proportion of from 6 oz. to 24 oz. per gallon of water, according to whether a thin or thick gel is desired, in conjunction with balanced proportions of borax and monosodium phosphate, the amounts of these two latter ingredients each lying between the limits of one to three ounces per gallon of water.

Premixed aqueous compositions, as hereinbefore described, should be frozen until solid at temperatures below their respective freezing (melting) points for proper activation. This can be done by placing the composition in a sufficiently cold compartment such as a deep freeze or in contact with a refrigerant coil operating in conjunction with a mechanical compressor. For example, a convenient unit can be made by embedding a pipe coil in a mass of refrigerant composition within a suitable container, the ends of the pipe projecting from the container and being attachable to a mechanical compressor so that low-temperature fluid from the compressor can circulate through the coil.

Following are examples of premixed aqueous refrigerant compositions:

*Example 5.*—A pasty composition to be put in cans or other sealed containers for use as a dry, portable refrigerant body at the temperatures indicated in the following table:

| Temperatures (° Fahr) | 20 | 10 | 0 | −10 | −20 |
|---|---|---|---|---|---|
| Water, gallons | 240 | 240 | 240 | 240 | 240 |
| Preservative solution,[1] pts | 4 | 4 | 4 | 4 | 4 |
| Urea, lbs | 15 | 60 | 180 | 450 | 540 |
| Ammonium Chloride, lbs | 4 | 30 | 60 | 120 | 240 |
| Potassium Chloride, lbs | 75 | 180 | 210 | 240 | 270 |
| Plaster of Paris, lbs | 15 | 30 | 30 | 30 | 30 |
| Locust Bean Gum, lbs | 40 | 30 | 30 | 30 | 30 |
| Potassium Alum, lbs | 15 | 15 | 15 | 15 | 15 |

[1] See footnote—table of Example 6.

*Example 6.*—Composition in the form of gels to be frozen and used as refrigerants at 0° F.

|  | Soft | Medium | Stiff |
|---|---|---|---|
| Water, gallons | 240 | 240 | 240 |
| Preservative solution,[1] pts | 4 | 4 | 4 |
| Urea, lbs | 180 | 180 | 180 |
| Ammonium Chloride, lbs | 60 | 60 | 60 |
| Potassium Chloride, lbs | 240 | 240 | 240 |
| Plaster of Paris, lbs | 30 | 30 | 30 |
| Locust Bean Gum, lbs | 120 | 240 | 360 |
| Borax, lbs | 16 | 16 | 16 |
| Monosodium Phosphate | 15 | 15 | 15 |

[1] The preservative solution is prepared by dissolving 8 lbs. butyl para-hydroxy benzoic acid (Butoben) in 5 gallons propylene glycol.

The invention can be carried out in a number of ways. A quantity of the powdery mixture described in Example 1 may be inserted in a container which also holds a quantity of water equal to half the weight of the powder, the powder and water being kept separate. When a refrigerating effect is desired (a cold pack, for example) the powder and water are mixed. This promptly reduces the temperature of the mixture by as much as 50°.

Another way of carrying out the invention is to mix the ingredients given in Example 2 with from two to three times their weight of ice. The resulting mixture is enclosed in a moisture-proof container such as a polyethylene or vinyl plastic bag the mouth of which is then tied or sealed. The bag with its contents is placed in a container such as a barrel or case in which articles to be shipped, such as flowers, live lobsters or other food stuffs are packed. In mixing the powdery ingredients with ice, an intimate mixture of cracked ice and powder can be made, or cracked ice and powder can be deposited alternately in layers, or a block or slab of ice can be enveloped in a layer of the powder mixture. As the ice melts, the resultant water is absorbed by the gel-forming ingredients so that there is never any free liquid present to leak out in case the container is broken defective. A package of this description is thus highly desirable for shipment by aeroplane or other carrier where the leakage of liquids from packages can damage other packages underneath them, or the carrier itself.

In the case of a truck or railroad car having a special compartment with a drain, the refrigerating mixture described in Example 3 can be mixed with from two to five times its weight of ice and loaded into the compartment provided therefor.

It has been determined experimentally that the mixture of ice and powder hereinbefore described will provide a degree of refrigeration equal to or better than the refrigeration obtainable from ice alone having a weight equal to that of an ice and powder mixture, and will substantially outlast a similar quantity of ice alone.

Another way of carrying out the invention is to prepare an aqueous mixture from any of the formulae given in Example 5, filling small containers such as metal cans, boxes or bags ranging in capacity from ½ pint to two quarts or more with such mixture, and sealing the containers. Such a container is placed in a low-temperature compartment until the contents are frozen. The container is then available for use in lieu of ice in a lunch box, small ice-box, or elsewhere. After each such use, the contents of the container can be refrozen repeatedly for reuse.

Another way of carrying out the invention is to make up a stiff gel using the formula of Example 6. When the gel has formed, it may be cut into cubes, slabs, chunks or any other shapes and then frozen. The frozen cubes or chunks can be handled and used like the customary ice cubes or crushed ice now in use, but, having much lower melting points, they provide more effective refrigeration than does ice. When the gel chunks melt, there is no resultant free liquid. The chunks of gel can be refrozen for reuse. Where possible or convenient, the chunks of gel are preferably kept in tight containers to prevent loss of moisture which would alter the consistency of the gel.

I claim:

1. A composition in the form of a gel adapted to be frozen for use as a refrigerant, said composition consisting essentially of a quantity of water, temperature depressants and a heat insulating ingredient, said temperature depressants having a combined dry weight of from $1/25$ to $1/2$ of that of the water, said temperature depressants consisting of ammonium chloride, a quantity of urea from two to four times as much by weight as the ammonium chloride, and a quantity of potassium chloride from one-third to four times as much by weight as the combined weights of said ammonium chloride and urea, said heat insulating ingredient being selected from the group consisting of plaster of Paris and asbestos in an amount not greater than $1/8$ of the dry weight of the temperature depressants, and from 2 ounces to 24 ounces of locust bean gum per gallon of water.

2. A composition as described in claim 1, plus from one to two ounces of potassium alum per gallon of water.

3. A composition as described in claim 1 plus from one to three ounces of borax and from one to three ounces of monosodium phosphate per gallon of water, the quantities of borax and monosodium phosphate being approximately equal to each other.

4. A composition in the form of a gel adapted to be frozen for use as a refrigerant, said composition consisting essentially of the following ingredients in proportion to the quantities stated; water, 240 gallons; solution of butyl para-hydroxy benzoic acid in propylene glycol, 4 pts.; urea, 180 lbs.; ammonium chloride, 60 lbs.; potassium chloride, 240 lbs.; plaster of Paris, 30 lbs.; locust bean gum, 120 to 360 lbs.; borax, 16 lbs.; monosodium phosphate, 15 lbs.

References Cited in the file of this patent
UNITED STATES PATENTS

| 1,985,632 | Fleischer | Dec. 25, 1934 |
| 2,072,367 | Hill | Mar. 2, 1937 |
| 2,136,385 | Kaufman et al. | Nov. 15, 1938 |
| 2,333,862 | Hill et al. | Nov. 9, 1943 |